US011891321B2

(12) United States Patent
Yeh et al.

(10) Patent No.: US 11,891,321 B2
(45) Date of Patent: Feb. 6, 2024

(54) MODULAR SYSTEM FOR WASTE TREATMENT, WATER RECYCLING, AND RESOURCE RECOVERY IN A SPACE ENVIRONMENT

(71) Applicants: University of South Florida, Tampa, FL (US); UNITED STATES OF AMERICA AS REPRESENTED BY THE ADMINISTRATOR OF THE NATIONAL AERONAUTICS AND SPACE ADMINISTRATION, Washington, DC (US)

(72) Inventors: Daniel H. Yeh, Tampa, FL (US); Luke Roberson, Washington, DC (US); Talon Bullard, Tampa, FL (US); Melanie Pickett, Tampa, FL (US); Robert Bair, Tampa, FL (US); Ahmet Erkan Uman, Temple Terrace, FL (US)

(73) Assignees: UNIVERSITY OF SOUTH FLORIDA, Tampa, FL (US); UNITED STATES OF AMERICA AS REPRESENTED BY THE ADMINISTRATIOR OF NASA, Washington, DC (US)

( * ) Notice: Subject to any disclaimer, the term of this patent is extended or adjusted under 35 U.S.C. 154(b) by 0 days.

(21) Appl. No.: 17/353,608

(22) Filed: Jun. 21, 2021

(65) Prior Publication Data
US 2021/0395125 A1    Dec. 23, 2021

Related U.S. Application Data
(60) Provisional application No. 62/705,290, filed on Jun. 19, 2020.

(51) Int. Cl.
*C02F 9/00* (2023.01)
*C02F 3/28* (2023.01)
*C02F 103/00* (2006.01)

(52) U.S. Cl.
CPC ............... *C02F 9/00* (2013.01); *C02F 3/286* (2013.01); *C02F 3/2853* (2013.01);
(Continued)

(58) Field of Classification Search
CPC .......... C02F 9/00; C02F 3/2853; C02F 3/286; C02F 2103/005; C02F 2201/007;
(Continued)

(56) References Cited

U.S. PATENT DOCUMENTS 4,551,243 A * 11/1985 Martin ................... C12M 41/24
71/10
5,110,459 A * 5/1992 Baxter ...................... C02F 3/30
210/220

(Continued)

FOREIGN PATENT DOCUMENTS

CN   104291502 A * 1/2015 ............. C02F 1/441
EP   3284728 A1 * 2/2018 ............. B01D 61/58
(Continued)

OTHER PUBLICATIONS

CN104291502A_Wang_translated.pdf (Year: 2016).*
(Continued)

*Primary Examiner* — Ekandra S. Miller-Cruz
(74) *Attorney, Agent, or Firm* — Quarles & Brady LLP

(57) ABSTRACT

A modular system for waste treatment, water recycling, and resource recovery includes a buffer tank to receive and pre-treat raw organic waste, at least one reactor tank configured as an anaerobic bioreactor that receives and digests pre-treated waste from the buffer tank, a membrane module having a membrane configured to filter waste from the
(Continued)

digested waste from the at least one reactor tank to produce a permeate, a permeate collection tank configured to collect and store the permeate generated by the membrane module, a pump system having a plurality of pumps, and a control system configured to monitor the flow of waste and to control the pump system to control the flow of waste between the buffer tank, the at least one reactor tank, the membrane module, and the permeate collection tank.

19 Claims, 9 Drawing Sheets

(52) U.S. Cl.
CPC .. *C02F 2103/005* (2013.01); *C02F 2201/007* (2013.01); *C02F 2301/08* (2013.01); *C02F 2307/00* (2013.01)

(58) Field of Classification Search
CPC .... C02F 2301/08; C02F 2307/00; C02F 1/32; C02F 2201/001; C02F 2209/005; C02F 2209/42; C02F 2209/40; Y02E 50/30
USPC .......................................................... 210/603
See application file for complete search history.

(56) References Cited

U.S. PATENT DOCUMENTS

| | | | | |
|---|---|---|---|---|
| 5,580,449 | A * | 12/1996 | Wickins ................... | C02F 1/006 210/220 |
| 6,860,989 | B2 * | 3/2005 | Taylor, Jr. ................. | B09C 1/00 210/97 |
| 9,878,928 | B1 | 1/2018 | Muirhead | |
| 2004/0104157 | A1 * | 6/2004 | Beeman .................. | B01D 63/10 210/232 |
| 2011/0215039 | A1 * | 9/2011 | Acernese ................... | C02F 9/00 210/172.3 |
| 2016/0009581 | A1 * | 1/2016 | Gordon ..................... | C02F 1/40 210/102 |

FOREIGN PATENT DOCUMENTS

| | | | | |
|---|---|---|---|---|
| JP | H-07124597 A | * | 5/1995 | .............. C02F 1/441 |
| WO | WO-2016005770 A2 | * | 7/2014 | ................ C02F 3/00 |

OTHER PUBLICATIONS

JPH07124597A_Koyama_translated.pdf (Year: 1995).*
Uri_EXPRESS_Racks_NPL_2007.pdf (Year: 2007).*
EP3284728A1_Rucker_translated.pdf (Year: 2018).*
Williams, Moon Fact Sheet, NASA, https://nssdc.gasfc.nasa.gov/planetary/factsheet/moonfaact.html, 2020, 3 pages.
Xiao et al., Current State and Challenges of Full-Scale Membrane Bioreactor Applications: A Critical Review, Bioresource Technology, 2019, 271:473-481.
Xie et al., The Water Treatment and Recycling in 105-day Bioregenerative Life Support Experiment in the Lunar Palace 1, Acta Astronautica, 2017, 140:420-426.
Yenigun et al., Ammonia Inhibition in Anaerobic Digestion: A Review, Process Biochemistry, 2013, 48(5-6):901-911.
NASA, Expedite the Processing of Experiments to Space Station (EXPRESS) Rack Overview, Lee Jordan, NASA Marshall Space Flight Center, 2013, 8 pages.
NASA, Orion Quick Facts, 2014, 2 pages.
Muirhead et al., "Preventing precipitation in the ISS urine processor." 48th International Conference on Environmental Systems, 2018. 10 pages.
Anderson et al., Life Support Baseline Values and Assumptions Document, NASA, 2015, NASA/TP-2015-218570, 220 pages.
Anderson et al., NASA Environmental Control and Life Support Technology Development and Maturation for Exploration: 2018 to 2019 Overview, 49th International Conference on Environmental Systems, 2019, pp. 1-16.
Bair, Development of a Decentralized and Off-grid Anaerobic Membrane Bioreactor (AnMBR) for Urban Sanitation in Developing Countries, Dissertation, University of South Florida, 2016, 156 pages.
Barta et al., A Biologically-Based Alternative Water Processor for Long Duration Space Missions, NASA, ISLSWG BLS Workshop, May 18-19, 2015, 17 pages.
Calabria, Wastewater Nutrient Recovery Using Anaerobic Membrane Bioreactor (AnMBR) Permeate for Hydroponic Fertigation, Dissertation, University of South Florida, 2014, 105 pages.
Carter et al., Water Recovery System Architecture and Operational Concepts to Accommodate Dormancy, 47th International Conference on Environmental Systems, Jul. 17-20, 2017, 15 pages.
Carter et al., Status of ISS Water Management and Recovery, 48th International Conference on Environmental Systems, Jul. 8-12, 2018, 16 pages.
Carter et al., Status of ISS Water Management and Recovery, 49th International Conference on Environmental Systems, Jul. 7-11, 2019, 17 pages.
Christenson et al., Assessment of Membrane-Aerated Biological Reactors (MABRs) for Integration into Space-Based Water Recycling System Architectures, Gravitational and Space Research, 2018, 6(2):12-27.
Demirel et al., Two-Phase Anaerobic Digestion Processes: A Review, Journal of Chemical Technology and Biotechnology, 2002, 77(7):743-755.
Forget et al., Atmospheric Dust on Mars: A Review, 47th International Conference on Environmental Systems, Jul. 16-20, 2017, 13 pages.
Fu et al., How to Establish a Bioregenerative Life Support System for Long-Term Crewed Missions to the Moon or Mars, Astrobiology, 2016, 16(12):925-936.
Gitelson et al., Long-Term Experiments on Man's Stay in Biological Life-Support System, Advances in Space Research, 1989, 9(8):65-71.
Gros et al., Recycling Efficiencies of C,H,O,N,S, and P Elements in a Biological Life Support System Based on Micro-Organisms and Higher Plants, Advances in Space Research, 2003, 31(1):195-199.
Hendrickx et l., Microbial Ecology of the Closed Artificial Ecosystem MELiSSA (Micro-Ecological Life Support System Alternative): Reinventing and Compartmentalizing the Earth's Food and Oxygen Regeneration System for Long-Haul Space Exploration Missions, Research in Microbiology, 2006, 157(1):77-86.
Jiang et al., Anaerobic Digestion of Kitchen Waste: The Effects of Source, Concentration, and Temperature, Biochemical Engineering Journal, 2018, 135:91-97.
Jiang et al., Ammonia Inhibition and Toxicity in Anaerobic Digestion: A Critical Review, Journal of Water Process Engineering, 2019, 32:100899, pp. 1-34.
Jo et al., A Comparative Study of Single- and Two-Phase Anaerobic Digestion of Food Waste Under Uncontrolled pH Conditions, Waste Management, 2018, 78:509-520.
Jonsson et al., Composition of Urine, Feaces, Greywater and Biowaste for Utilisation in the URWARE Model, Urban Water Report Jun. 2005, Copyright Urban Water, Chalmers University of Technology, 2005, 49 pages.
Kelsey et al., Closing the Water Loop for Exploration: 2018 Status of the Brine Processor Assembly, 48th International Conference on Environmental Systems, Jul. 8-12, 2018, 18 pages.
Lasseur et al., MELiSSA: The European Project of Closed Life Support System, Gravitational and Space Biology, 2010, 23(2):3-12.
Li et al., Two-Phase Anaerobic Digestion of Municipal Solid Wastes Enhanced by Hydrothermal Pretreatment: Viability, Performance and Microbial Community Evaluation, Applied Energy, 2017, 189:613-622.
Lukitawesa et al., Factors Influencing Volatile Fatty Acids Production from Food Wastes via Anaerobic Digestion, Bioengineered, 2020, 11(1):39-52.

(56) References Cited

OTHER PUBLICATIONS

Magdalena et al., Impact of Organic Loading Rate in Volatile Fatty Acids Production and Population Dynamics Using Microalgae Biomass as Substrate, Scientific Reports, 2019, 9:18374, pp. 1-11.
Massa et al., VEG-01: Veggie Hardware Validation Testing on the International Space Station, Open Agriculture, 2017, 2(1):33-41.
Mirmohamadsadeghi et al., Biogas Production from Food Wastes: A Review on Recent Developments and Future Perspectives, Bioresource Technology Reports, 2019, 7:100202, 10 pages.
Musa et al., Effect of Organic Loading Rate on Anaerobic Digestion Performance of Mesophilic (UASB) Reactor Using Cattle Slaughterhouse Wastewater as Substrate, International Journal of Environmental Research and Public Health, 2018, 15(10):2220, 19 pages.
NASA, Skylab, Our First Space Station, Chapter 5: The First Manned Period, 1977, pp. 77-94.
NASA, Express Racks 4 and 5, Fact Sheet No. FS-2001-07-129-MSFC, Release Date: Jul. 2001, 2 pages.
NASA, Marshall Space Flight Center, Advanced Space Transportation Program: Paving the Highway to Space, https://www.nasa.gov/centers/marshall/news/background/facts/astp.html, 2008, 3 pages.
NASA, International Space Station, Higher Altitude Improves Station's Fuel Economy, Feb. 14, 2011, 2 pages.
NASA Technology Roadmaps TA 6: Human Health, Life Support, and Habitation Systems, 2015, 217 pages.
NASA MARS Exploration Rovers, Moving Around Mars, https://mars.nasa.gov/mer/mission/timeline/surfaceops/navigation, 2019, 1 page.
NASA, Marshall History, ECLSS, https://www.nasa.gov/centers/marshall/history/eclss.html, Last Updated:Mar. 10, 2020, 9 page.
NASA, NASA's Plan for Sustained Lunar Exploration and Development, 2020, 13 pages.
Nelson et al., The Water Cycle in Closed Ecological Systems: Perspectives from the Biosphere 2 and Laboratory Biosphere Systems, Advances in Space Research, 2009, 44(12):1404-1412.
Peterson, Environmental Control and Life Support System (ECLSS), System Engineering Workshop, Life Sciences Department, NASA/Johnson Space Center/Crew and Thermal Systems Division, 2009, 22 pages.

Pickett et al., Regenerative Water Purification for Space Applications: Needs, Challenges, and Technologies Towards 'Closing the Loop', Life Sciences in Space Research, 2020, 24:64-82.
Prieto et al., Development and Start Up of a Gas-Lift Anaerobic Membrane Bioreactor (GI-AnMBR) for Conversion of Sewage to Energy, Water and Nutrients, Journal of Membrane Science, 2013, 441:158-167.
Prieto et al., Complex Organic Particulate Artificial Sewage (COPAS) as Surrogate Wastewater in Anaerobic Assays, Environmental Science: Water Research & Technology, 2019, 5(10):1661-1671.
Scheuring et al., The Apollo Medical Operations Project: Recommendations to Improve Crew Health and Performance for Future Exploration Missions and Lunar Surface Operations, NASA/TM-2007-214755, Aug. 2007, 458 pages.
Sevanthi et al., Long Term Biological Treatment of Space Habitation Waste Waters in a One Stage MABR: Comparison of Operation for N and C Oxidation With and Without Simultaneous Denitrification, 48th International Conference on Environmental Systems, 2018, pp. 1-17.
Simonsen et al., Radiation Protection for Human Missions to the Moon and Mars, NASA-TP-3079, Feb. 1991, 27 pages.
Stapleton et al., Environmental Control and Life Support for Deep Space Travel, 48th International Conference on Environmental Systems, Jul. 8-12, 2018, pp. 1-11.
Tako et al., One-Week Habitation of Two Humans in an Airtight Facility with Two Goats and 23 Crops—Analysis of Carbon, Oxygen, and Water Circulation, Advances in Space Research, 2008, 41(5):714-724.
Vu et al., The Performance of a Gaslift MBR for Slaughterhouse Wastewater Treatment in 1 m/day Scale, Modern Environmental Science and Engineering, 2017, 3(5):349-354.
Walker et al., MELiSSA the Minimal Biosphere: Human Life, Waste and Refuge in Deep Space, Futures, 2017, 92:59-69.
Wang et al., Chapter 1—Reverse Osmosis Membrane Separation Technology, In Membrane Separation Principles and Applications, 2019, pp. 1-45.
Wheeler et al., Nutrient, Acid and Water Budgets of Hydroponically Grown Crops, In International Symposium on Growing Media and Hydroponics, 1997, 481:655-662.
Williams, Mars Fact Sheet, NASA, https://nssdc.gasfc.nasa.gov/planetary/factsheet/marsfaact.html, 2018, 4 pages.

\* cited by examiner

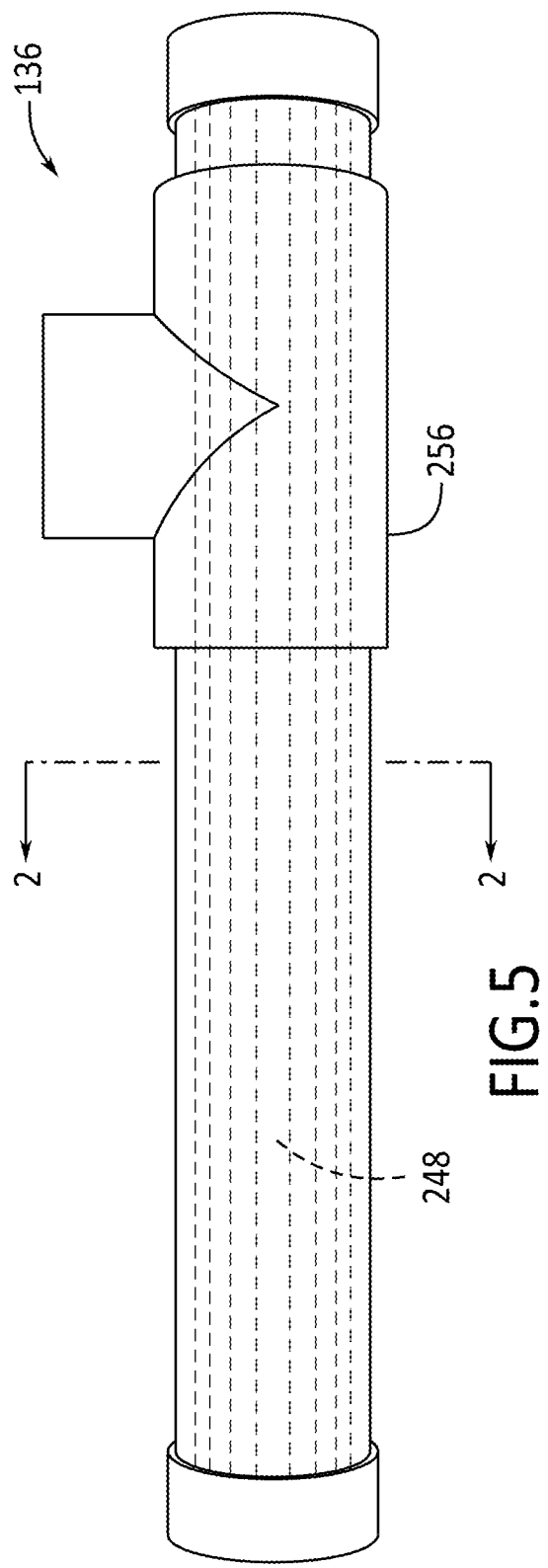
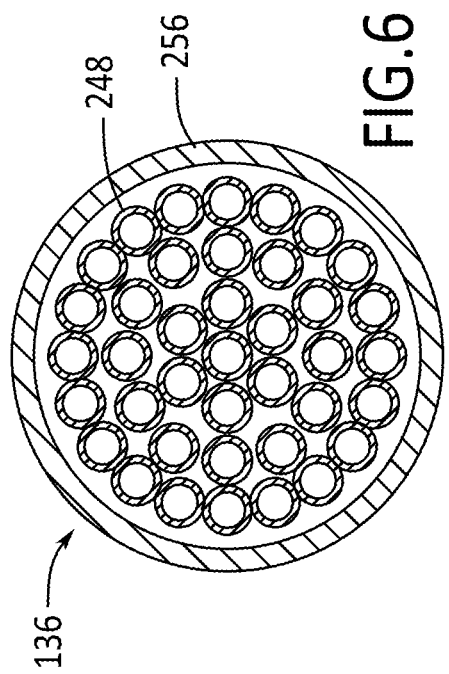

MODULAR SYSTEM FOR WASTE TREATMENT, WATER RECYCLING, AND RESOURCE RECOVERY IN A SPACE ENVIRONMENT

CROSS-REFERENCES TO RELATED APPLICATIONS

This application claims the benefit and priority of U.S. Provisional Application No. 62/705,290, filed on Jun. 19, 2020, which is incorporated herein by reference in its entirety.

STATEMENT REGARDING FEDERALLY SPONSORED RESEARCH

This invention was made with government support under 80NSSC18K1692 awarded by the National Aeronautics and Space Administration. The government has certain rights in the invention.

TECHNICAL FIELD

This disclosure is directed to a system for treating waste, recycling water, and recovering additional resources such as energy and nutrients. More specifically, the system is a modular system for treating both liquid and solid organic waste in a space (e.g. zero gravity or micro-gravity) environment, which can be transported easily and rapidly reassembled onsite within a spacecraft or space station to form the modular system, and which can be interconnected with other modular systems to form a larger architecture.

BACKGROUND

Long-duration, deep-space human exploration missions will demand robust and reliable technologies to ensure crew health, safety, and mission success. However, current Environmental Control and Life Support Systems (ECLSS) technologies, such as those used aboard the International Space Station (ISS), are not optimized for long-duration, deep-space human exploration, but rather, for the low earth orbit (LEO) environment of the ISS.

For example, the Water Recovery System (WRS) does not treat all forms of waste, namely fecal and food waste, which are disposed of without any recovery efforts. Additionally, while the Water Processor Assembly (WPA) achieves approximately 85% recovery, it also utilizes consumables including disposable filters and stored oxygen. Further, food is solely supplied via resupply shipments, as sustainable food production technologies are only on an experimental level and are dependent on resupply shipments for cultivation resources (nutrients, fertilizer, etc.). While resupply of such resources may be viable for short-term or LEO missions, the increased costs, lengthened transit times, and more frequent resupply shipments associated with long-term and deep-space travel present additional financial and logistical challenges that highlight the need for a more sustainable ECLSS architecture for long-duration, deep-space human exploration.

Thus, to make such long-duration explorations possible, in situ food production and waste management is essential for these missions to maintain crew health, nutrition, morale, and to ensure crew safety in the event of delays or failures. One way to address both of these problems is to provide resource and waste recovery systems that are capable of achieving nearly closed-loop systems. In particular, solid organic wastes (i.e., fecal and food) offer a renewable source of carbon, nitrogen, phosphorous (C, N, P), water and other trace elements to sustain water and food production. However, these high-strength waste streams are difficult to treat, due to factors such as heterogeneity, complexity, high solids content, and presence of pathogens. Currently, there are no flight-ready technologies capable of treating mixed organic wastes, underlining a technology gap for long-duration and deep-space missions.

In light of at least the above, a need exists for a waste and resource recovery system having the ability to treat both solid and liquid organic wastes, and which is able to operate efficiently and reliably in the harsh conditions of space. Furthermore, it is desirable that such a waste and resource recovery system be modular to be used in a wide variety of applications and so that it can be broken down into various sub-systems that can be easily transported and replaced, and which can be combined with other systems as part of a larger ECLSS. The discussion above is merely provided for general background information and is not intended to unduly limit the scope of the claimed subject matter.

SUMMARY

The above problems can be solved by providing a modular system for waste treatment, water recycling, and resource recovery, that does not rely on gravity-driven separation.

In some embodiments a modular system for waste treatment, water recycling, and resource recovery in a space environment includes a buffer tank, at least one reactor tank, a membrane module, a permeate collection tank, a pump system, and a control system. The buffer tank is configured to receive and pre-treat raw organic waste. The at least one reactor tank is configured as an anaerobic bioreactor that receives and digests pre-treated waste from the buffer tank. The membrane module has a membrane configured to filter digested waste from the at least one reactor tank to produce a permeate. The permeate collection tank is configured to collect and store the permeate generated by the membrane module. The pump system has a plurality of pumps to pump waste between the buffer tank, the at least one reactor tank, the membrane module, and the permeate tank. The control system is configured to monitor the flow of waste and to control the pump subsystem to control the flow waste between the buffer tank, the at least one reactor tank, the membrane module, and the permeate collection tank In other embodiments a modular system for waste treatment, water recycling, and resource recovery includes a support structure, a waste treatment system, a pump system, and a control system. The waste treatment system includes a buffer tank configured to receive and pre-treat raw organic waste, a first reactor tank configured as an anaerobic digester that receives and digests pre-treated waste from the buffer tank, a second reactor tank configured as an anaerobic digester that receives digested waste from the first reactor tank, a membrane module having a membrane configured to filter waste from the digested waste from the second reactor tank to produce a permeate, and a permeate collection tank configured to collect and store the permeate generated by the membrane module. The pump system has a plurality of pumps configured to pump waste through the waste treatment system. The control system is configured to monitor the flow of waste and to control the pump system to control the flow of waste through the waste treatment system.

In another aspect, the present disclosure provides a method for installing, configuring, and/or maintaining a modular system for waste treatment. The method may comprise: identifying a first modular unit of a modular waste treatment system that is in a replacement state, based upon at least one of a fault indicator, a liquid indicator, a pressure indicator, a low-level indicator, a high-level indicator, or a flow indicator; disconnecting fittings of the first modular unit, and removing the first modular unit from a storage rack containing a group of modular units; connecting fittings of a replacement modular unit to at least one other modular unit of the waste treatment system, and disposing the replacement modular unit in place of the first modular unit in the storage rack; initializing the waste treatment system after connecting the fittings of the replacement modular unit; and wherein the waste treatment system consists essentially of modular units comprising one or more pumping subsystems; one or more control subsystems; and one or more tank subsystems.

This Summary and the Abstract are provided to introduce a selection of concepts in a simplified form that are further described below in the Detailed Description. This Summary is not intended to identify key features or essential features of the claimed subject matter.

DRAWINGS

The following detailed description is to be read with reference to the figures, in which like elements in different figures have like reference numerals. The figures, which are not necessarily to scale, depict selected embodiments and are not intended to limit the scope of embodiments of the disclosure. Given the benefit of this disclosure, skilled artisans will recognize the examples provided herein have many useful alternatives that fall within the scope of the disclosure.

FIG. 5 is a side view of an example membrane module of the modular system of FIG. 1 according to according to aspects of the disclosure;

FIG. 6 is section view of the membrane module of FIG. 5 taken along line 2-2;

Figure 1:
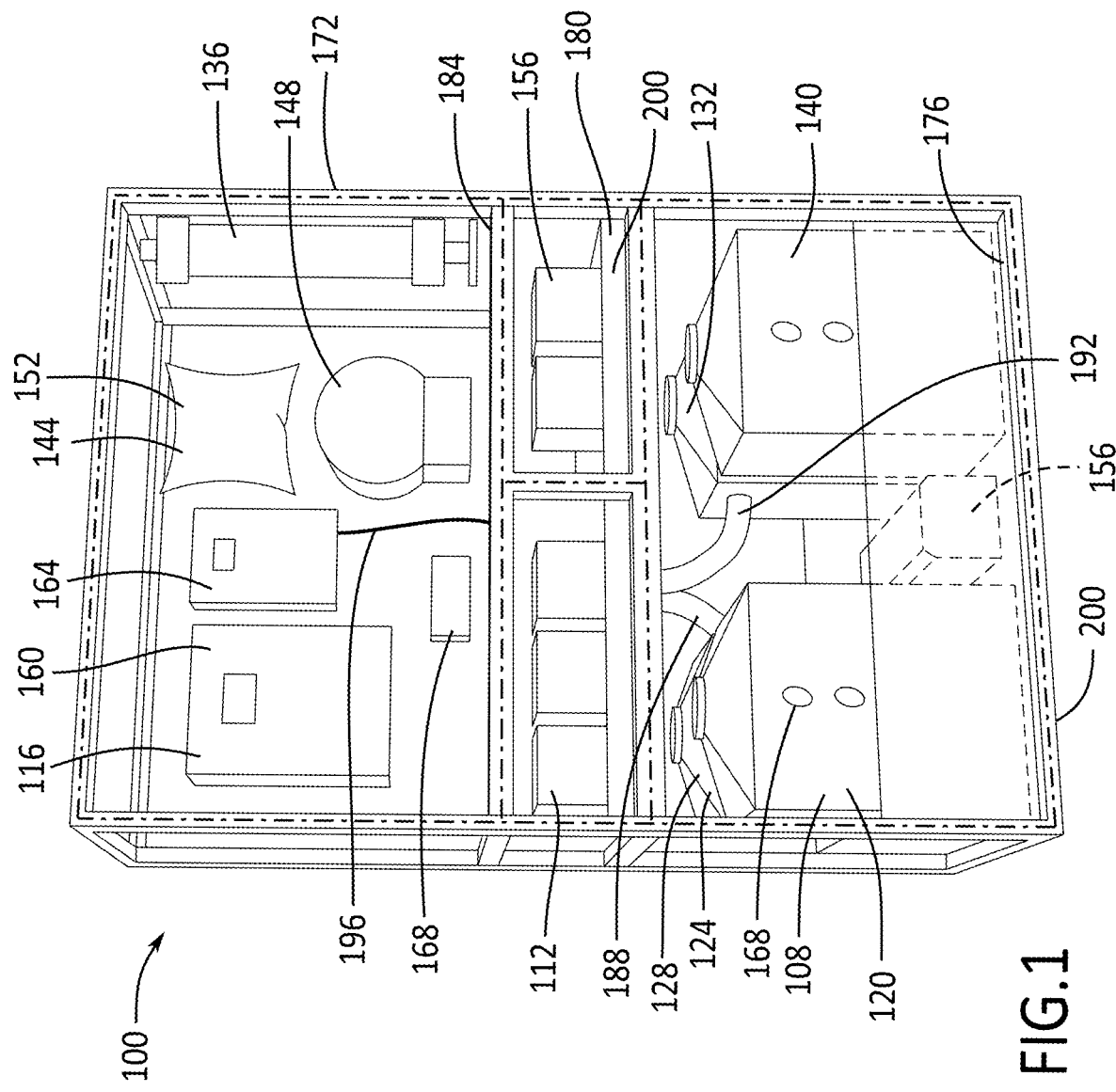
FIG. 1 is a perspective view of an example modular system for treating waste, recycling water, and recovering additional resources according to aspects of the disclosure.
Figure 7:
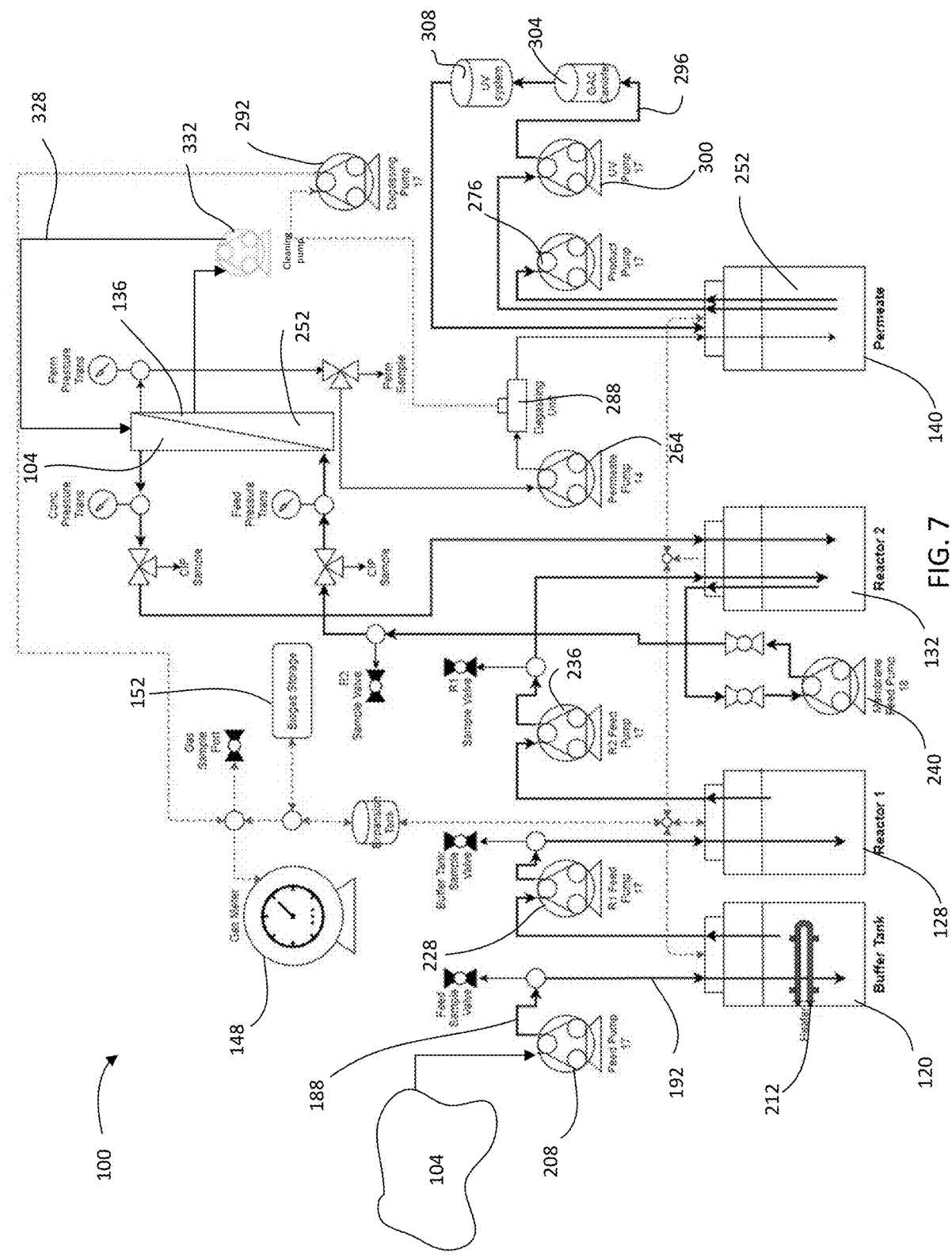
Figure 8:
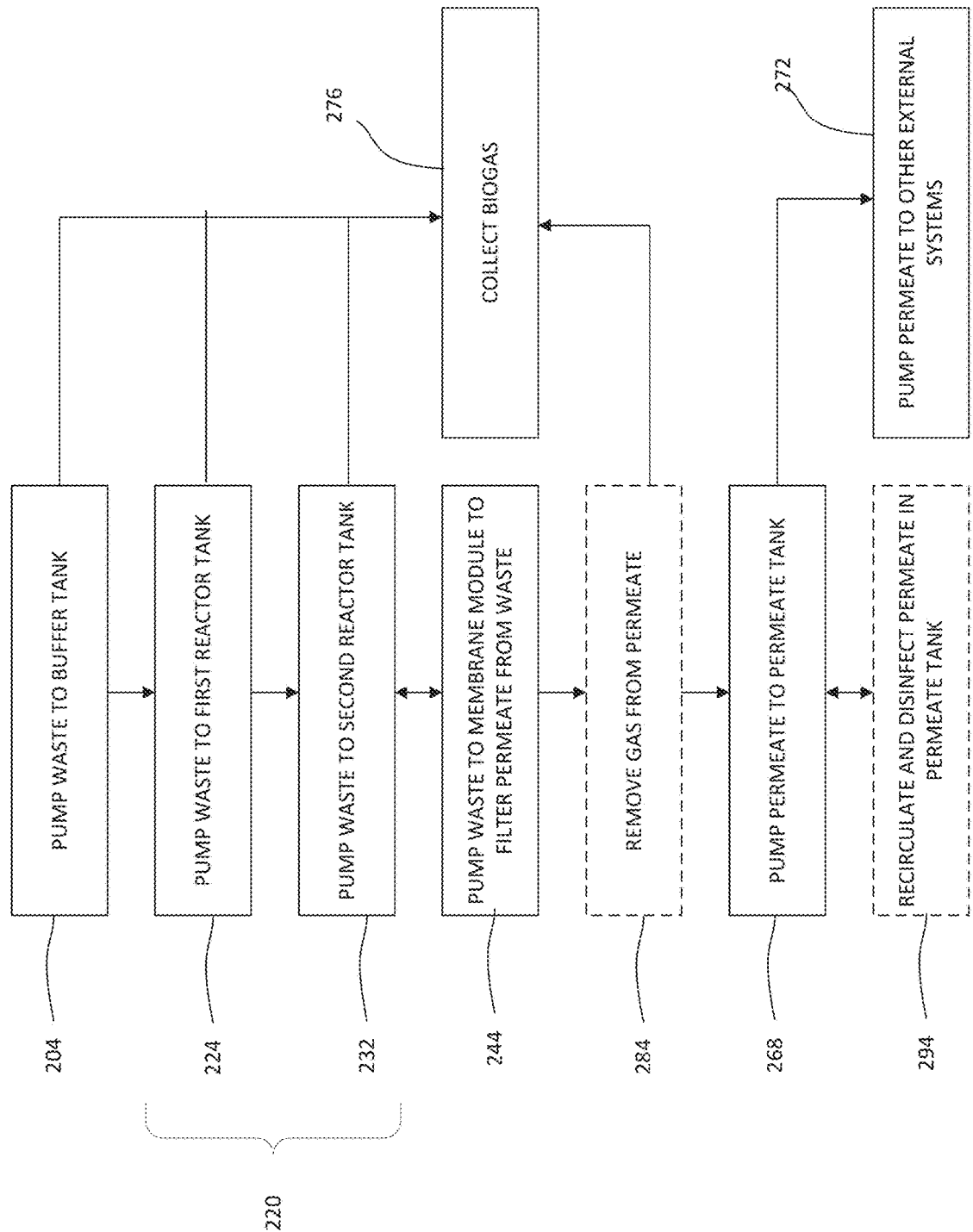
Figure 9:
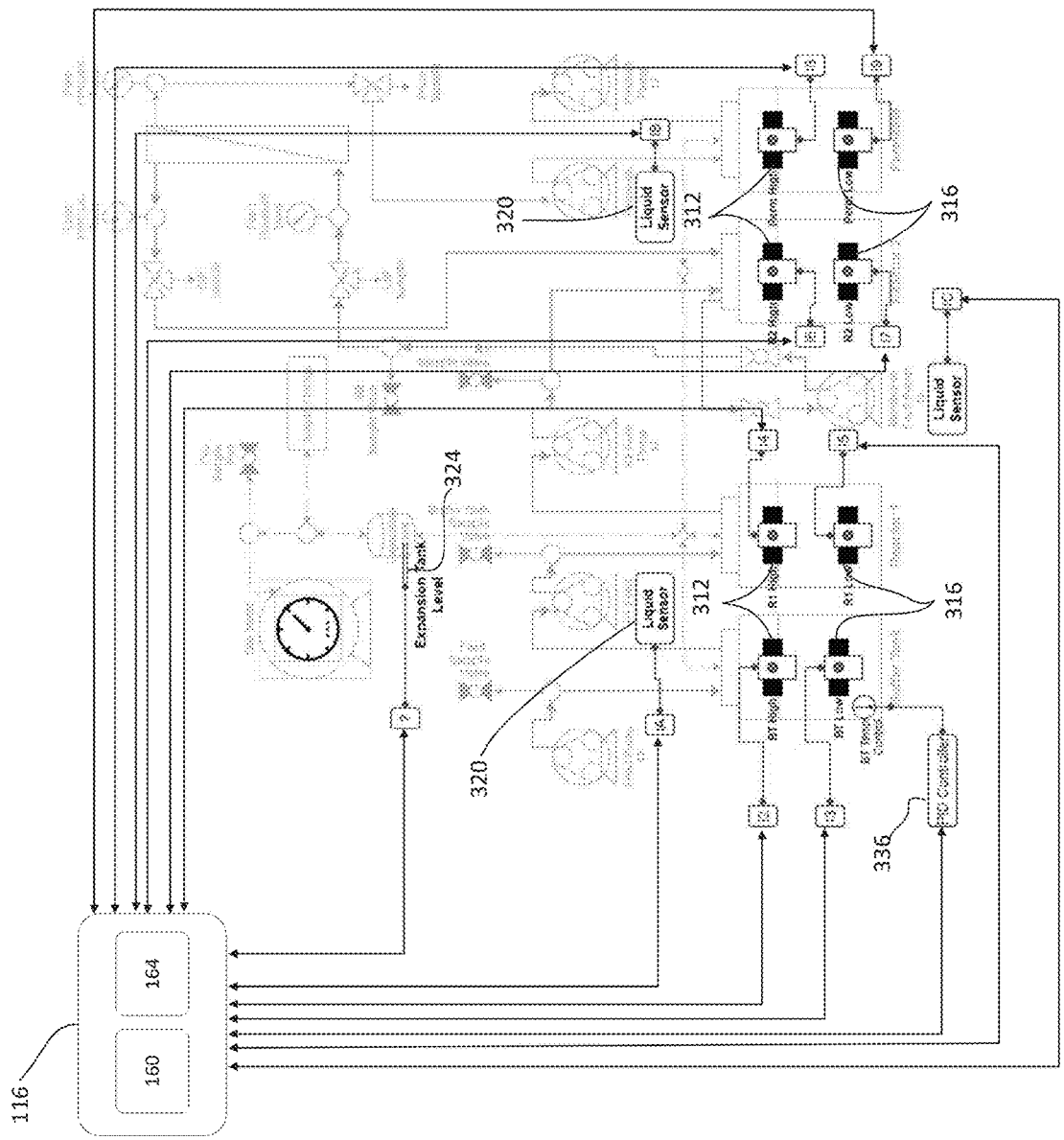

FIG. 7. is a schematic view of a flow diagram of the modular system of FIG. 1 including additional processes;

FIG. 8 is a method of anaerobic digestion of waste that can be performed by the modular system of FIG. 7; and FIG. 9 is a schematic view of the modular system of FIG. 1, showing the control system.

Figure 10:
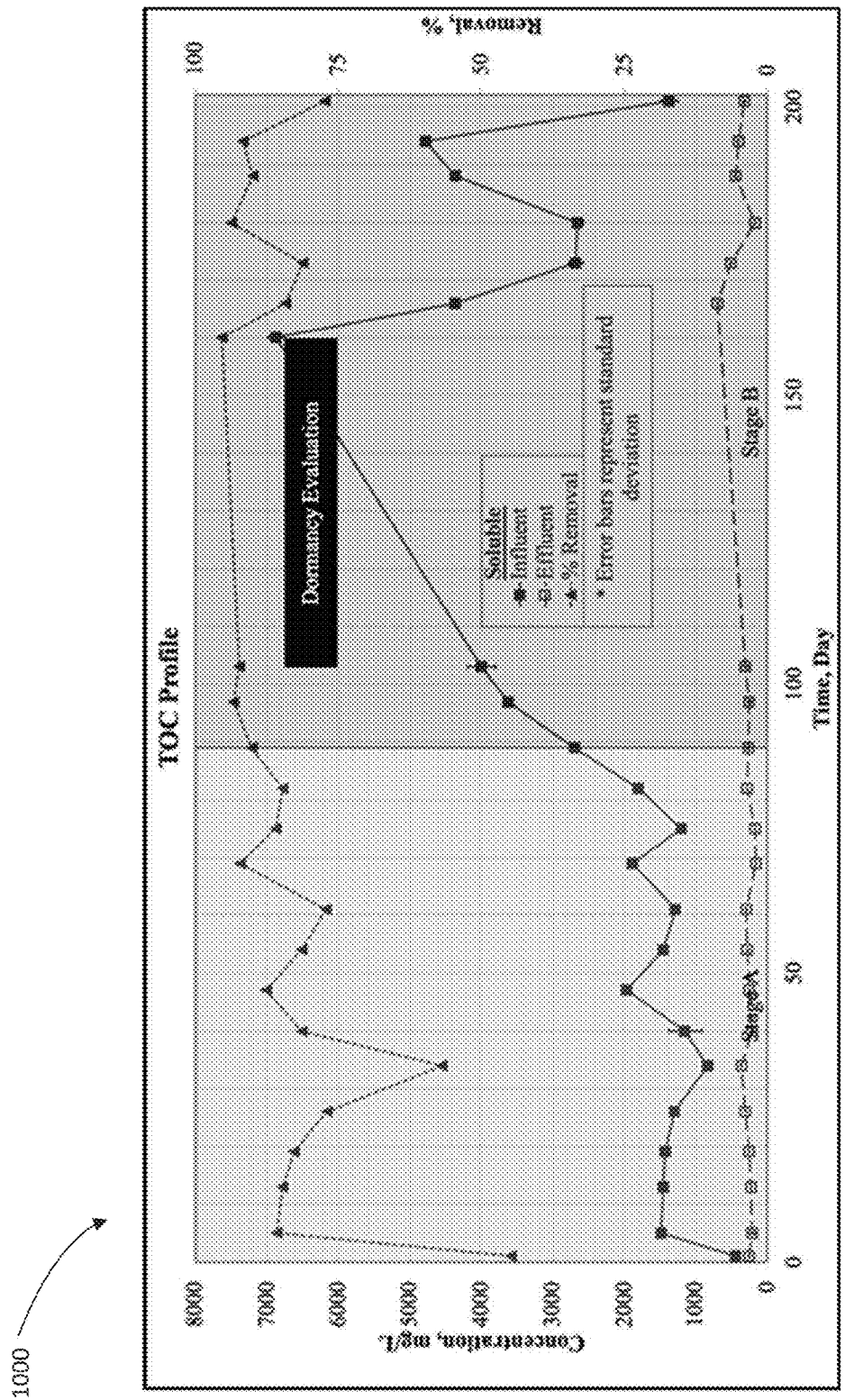

FIG. 10 is a graph showing results of an experiment performed using one embodiment of the systems and methods disclosed herein.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having," and variations thereof, herein is meant to encompass the items listed thereafter and equivalents thereof as well as additional items. Unless specified or limited otherwise, the terms "mounted," "connected," "supported," and "coupled," and variations thereof, are used broadly and encompass both direct and indirect mountings, connections, supports, and couplings. Likewise, "connected" and "coupled" are not restricted to physical or mechanical connections or couplings unless identified as such. Furthermore, throughout the description, terms such as front, back, side, top, bottom, up, down, upper, lower, inner, outer, above, below, and the like are used to describe the relative arrangement and/or operation of various components of the example embodiment; none of these relative terms are to be construed as limiting the construction or alternative arrangements that are within the scope of the claims The following discussion is presented to enable a person skilled in the art to make and use embodiments of the disclosure. Given the benefit of this disclosure, various modifications to the illustrated embodiments will be readily apparent to those skilled in the art, and the generic principles herein can be applied to other embodiments and applications without departing from embodiments of the disclosure. Thus, embodiments of the disclosure are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the disclosure. Skilled artisans will recognize the examples provided herein have many useful alternatives and fall within the scope of embodiments of the disclosure.

As noted above, a need exists for an efficient waste and resource recovery system having the ability to treat both solid and liquid organic wastes in a space environment, zero gravity environment, micro gravity environment, or partial gravity environment. In some applications in which such a system would prove useful, the system may encounter more than one of these environments during the same mission. Embodiments of the disclosure can be useful for these purposes and may be particularly adapted to use in long-duration space exploration.

However, systems and methods such as described herein may also be useful in other applications where compactness, portability, ease of transport and assembly, modularity, efficiency and long-term durability are desirable, for example, marine, military, emergency, household, parks and camp grounds, eco-tourism, and various remote off-grid applications For instance, in situations in which a specialist or technician could not arrive to assist in diagnosing and solving a system problem, or in which it is important to be able to quickly install, modify, or repair a system, the rapid and easy nature of installation of modular units of a system such as disclosed herein is particularly advantageous.

As described below, a modular system having the various features and advantages described herein can allow for simple, rapid fault diagnosis and component replacement, even by individuals who are not specialists or technicians. By having a modular design that does not rely on a specific gravity driven process, various pumps, controllers, and tanks can be effectively rearranged and swapped out of an overall compact wastewater treatment system. For example, in some embodiments, modular units may each contain a subsystem (e.g., pumping, controls, tanks, etc.) or subassembly (an individual tank plus connections, or an individual control unit responsible for a specific function, like user interface or pump control, or interfacing with other systems like nutrient collection). Each module may be self contained, and sealed except for the quick connect junctions. And, sensors may be disposed to help identify which module is causing a fault or requires maintenance. For example, water sensors may be disposed throughout each module, to detect the presence of water in an area that should not ordinarily contain water (such as water present outside of a tank or hose, in the bottom of a module, or any water/moisture in a control subsystem module). Similarly, pressure, flow and fill level sensors may be disposed throughout modules containing pumping and tank functions. If an over-pressure or water alert is detected in a given module, a user (even a user who is not a specialist or technician for wastewater treatment systems) can be alerted via a user interface, LED, etc., that a module should be swapped out. This way, the user is not required to attempt to diagnose and solve a problem with, for example, a leaking seal within a tank—rather the entire tank module would simply be removed and replaced.

FIG. 1 illustrates an example modular a system 100 for treating waste, recycling water, and recovering additional resources such as energy and fertilizer nutrients. As shown, the modular a system 100 may be configured as an Organic Processor Assembly (OPA), which is particularly adapted for operation in a space, partial gravity, zero gravity, micro gravity or other environment, and more specifically for long-duration space travel and surface habitats. The OPA 100 may be configured to process raw organic waste 104, that is, the solids and organics found in fecal waste, liquid waste (e.g., urine), and/or other organic matter (e.g., food waste) to produce an effluent capable of downstream treatment by additional systems.

For example, the OPA 100 may be configured to connect with a nutrient processor assembly (NPA), a food production assembly (FPA), a water processor assembly (WPA), and/or a solids processor assembly (SPA). In some embodiments, the OPA can interconnect with other systems to coordinate and allow for additional functions to be provided to the crew in accordance with mission requirements. The early phase of planetary habitat establishment may focus mainly on survival, with few systems available. However, later phases may focus more on sustainable architecture with emphasis on resource recovery for food production, so additional systems might be brought in to add function. As such, having a modular system for waste treatment that can be rearranged and repositioned would be advantageous. For example, in some embodiments, the OPA can go from operating as a standalone assembly providing its own function to connecting with a nutrient processor assembly (NPA), food production assembly (FPA), water processor assembly (WPA), and/or solids processor assembly (SPA). Each of the assemblies may have sub-systems and/or sub-assemblies of their own, similar to the design on the organic processor assembly, or a different utilization of the sub-assembly spaces in a common rack system.

One advantage of the disclosed system architecture is that it can be mixed and matched depending on mission nature and duration. For example, early missions to Moon or Mars tend to be shorter in duration and may be more focused on survivability. Supplies to enable short term survival would likely be included as part of the cargo. Because of the limited nature of available supplies, it might be the case that the only resource recovered is water. Food will not be produced locally, due to the complexities and extra mass/volume associated with food production. Without food production, there is little incentive to recover nutrients for fertilizer. Organic wastes (fecal and food wastes) will not be recycled; rather, they may be processed to render harmless via the solids processing assembly. Thus, in some circumstances a nutrient processor assembly (NPA) will be utilized for pretreatment of urine and hygiene water before a WPA, and will perform nutrient removal rather than recovery. Examples of technologies for the NPA include (but are not limited to) algae photobioreactor, aerobic MBR, ion exchange, precipitation, electrochemical deionization systems, and membranes, used separately or in combinations.

As human presence on Moon or Mars expand, later phase missions will focus more on sustainability, meaning recovery of resources locally as much as possible, in order to reduce reliance on resupply missions. A major part of sustainable presence is local food production via the FPA. Hence, the OPA would be needed in order to enable resource recovery to support the FPA. The NPA will shift to nutrient recovery mode rather than nutrient removal. As the population of the habitat or colony grows, additional units of the processor assemblies can be brought in for additional function and operated in a coordinated fashion to expand system capacity.

Accordingly, it can be seen that the modular nature of systems such as disclosed herein allow for gradual addition, rearrangement, and modification of functions performed by various waste processing assemblies.

According to some embodiments, a system (such as an OPA) 100 may be a modular system that may include a waste treatment system 108, a pump system 112, and a control system 116. As shown, the waste treatment system 108 may include a buffer tank 120, a reactor 124 (i.e., a two-stage reactor 124 having a first reactor tank 128 and a second reactor tank 132), a membrane module 136, and a permeate tank 140. Each of the buffer tank 120, the first reactor tank 128, the second reactor tank 132, and the permeate tank 140 are shown as being the same size, however, this may not always be the case and the respective sizes of the buffer tank 120, the first reactor tank 128, the second reactor tank 132, and the permeate tank 140 can be modified to fit a specific application. For example, it may be advantageous to have a buffer tank 120 that is larger or to have more than one buffer tank 20 to increase the capacity of the OPA 100 and/or increase residence time of the waste 104 in the buffer tank 120. It should be appreciated that similar principles may be equally applied to any of the other components and/or systems of the OPA 100. Additionally, the waste treatment system 108 may include a gas collection system 144 configured to collect biogas (e.g. methane) from any of the buffer tank 120, the first reactor tank 128, the second reactor tank 132, and/or the permeate tank 140. The gas collection system 144 may include a gas meter 148 configured to measure the amount and/or pressure of biogas in the waste treatment system 108, and a flexible and/or expandable gas collection bag 152 configured to temporarily store any biogas produced by the waste treatment system 108 to buffer the OPA 100 against potential internal pressure changes due to water level fluctuations. Because a system such as the OPA shown in FIG. 1 can be configured as a closed-tank, anaerobic system, the design of the system should take into account that there may be fluctuations in tank fill volume and flow rate. Due to the movement of liquids being pumped into the buffer tank and then successively into the rest of the tanks, it can be assumed that there might be minor fluctuations in water level in all the tanks which are controlled by level sensors. Thus, the gas collection bag 152 serves as a small, additional, variable headspace, volume or reservoir that can automatically inflate or deflate to help maintain appropriate volume for such fluctuations. By using the bag 152, water level fluctuations will not create an abrupt over pressurization or vacuum in the system. As biogas is produced by the reactors, or if there is an increase in water level, the gas first fills up the gas collection bag before it continues on to the gas measurement meter. However, if there is a decrease in water level, the gas bag deflates to maintain constant pressure in the reactors. In other words, gas bag 152 expands and deflates in accordance with fluctuations in water levels in the tanks. The actual storage (or immediate usage) of produced biogas can then be disposed outside of the OPA and/or the rack system.

The pump system 112 may include a plurality of pumps 156 that are configured to control the flow of waste 104 through the OPA 100. That is, the pump system 112 may cause the flow of waste 104 between each of the buffer tank 120, the first reactor tank 128, the second reactor tank 132, the membrane module 136, and the permeate tank 140. Here the pumps 156 are peristaltic pumps, which can operate independently of gravity, and which are easy to maintain and can easily be monitored for burst tubing, however other types of pumps may be used. It should be appreciated that the pump system 112 may further include a plurality of hoses or pipes and corresponding fittings to facilitate the transfer of waste 104 between the respective tanks. Additionally, the pump system 112 may include a number of pressure gauges, shut-off valves, and or sample valves to allow the pump system 112 and the waste treatment system 108 to be monitored without needing to pause operation of the OPA 100.

The control system 116 may be configured to monitor and control the flow of waste 104 through the OPA 100. More specifically, the control system 116 may include a programmable logic controller 160 (PLC) or other microprocessor (e.g., running operating systems such as Arduino, Raspberry Pi, Latte, Panda, etc.), onboard memory 164, and a plurality of sensors 168 (e.g., capacitive liquid level sensors, pressure sensors, flow rate sensors, and/or temperature sensor) configured to measure the amount of waste 104 in each of the buffer tank 120, the first reactor tank 128, the second reactor tank 132, and the permeate tank 140, and to control the pump system 112 to control the flow waste 104 between each of the respective tanks. In particular, the sensors 168 may provide a signal (e.g. an electrical signal) to the control system 116, which may be configured receive an input signal any of the sensors 168 to operate the pump system 112 to maintain a desired level material in each the buffer tank 120, the first reactor tank 128, the second reactor tank 132, and the permeate tank 140. In this way, the control system 116, by controlling the pump system 112 in response to the signals of the sensors 168, can ensure that none of the buffer tank 120, the first reactor tank 128, the second reactor tank 132, and the permeate tank 140 overflow or become empty.

In some cases, the OPA 100 may also include one or more support structures 172 configured to support at least a portion of the OPA 100. Here, the OPA 100 is shown being supported by a support rack 172, and more specifically an EXPRESS (Expedite the Processing of Experiments to Space Station) rack that may be used to contain and support experiments to be conducted on the ISS. Use of an EXPRESS rack may be advantageous as it is commonly used and has a standardized size that can allow it to be used in numerous applications. However, other forms of support structures 172 are also contemplated, for example, other modular racking systems being developed for space applications (orbital, transit or surface habitat), by governmental or private entities, such as but not limited to Boeing, Space-X, Bigelow, Blue Origin, Sierra Nevada, Collins Aerospace, etc.

Here, the support structure 172 may be configured having first shelf 176, a second shelf 180, and a third shelf 184, although a support structure with more or less shelves, and/or drawers is also contemplated. The first shelf 176 may be configured to support a tank subsystem modular unit, which may contain each of the buffer tank 120, the first reactor tank 128, the second reactor tank 132, and the permeate tank 140. The second shelf 180 may be configured to support one or more pump subsystem modular units, each including at least a portion of the pumps 156 of the pump system 112 (another portion of the pumps 156 may be supported by either the first shelf 176 or the third shelf 184 to meet the requirements of a specific application, and depending on configuration of the modular units). Because at least a portion of the pump system 112 may be disposed on one or more separate shelves, the hoses 188 may include quick connect fittings 192 to allow the hoses 188 to be easily attached and detached, adding to the modularity and portability of the OPA 100. The third shelf 184 may be configured to support the control system 116, the membrane module 136, and the gas collection system 144.

It should be appreciated that when supported by the support structure 172, each of the first shelf 176, the second shelf 180, the third shelf 184, and their respective components may constitute individual subsystems or modular units that can be quickly attached and detached from any of the other sub-assemblies. To facilitate the attachment and detachment of the various subassemblies, the respective components may include a number of wiring harnesses and hoses with quick connect fittings to allow for easy setup and/or reconfiguration of the OPA 100. Any included wiring harnesses 196 and/or hoses 188 may be routed behind the support structure 172 to protect them from accidental damage. Furthermore, while the relative positions of the first shelf 176, the second shelf 180, and the third shelf 184 may be varied, it may be advantageous to position the first shelf 176 at the bottom so that the material contained inside each of the buffer tank 120, the first reactor tank 128, the second reactor tank 132, and the permeate tank 140 cannot accidentally spill on the other, more sensitive components contained on either of the second shelf 180 or the third shelf 184. Even so, spill trays 200 may be included to prevent leaks or spills from contacting any lower-positioned components. Similarly, keeping the third shelf 184 and its respective components (i.e. the buffer tank 120, the first reactor tank 128, the second reactor tank 132, and the permeate tank 140) near the bottom of the support structure 172 lowers the center of gravity of the OPA 100, making it less likely that the OPA 100 tips over.

Furthermore, it should be appreciated that, due to the modular nature of the OPA 100, the example embodiment shown in FIG. 1 is non-limiting and the OPA 100 may be customizable to allow the OPA 100 to be reconfigured to meet any number of use scenarios. In particular, it is contemplated that the OPA 100 may include more or less buffer tanks 120, reactors 124, permeate tanks 140, pumps 156, and control systems 116 to allow the OPA 100 to have increase or reduced capacity, or more tanks can be added or removed as needed to account for changing operational requirements. Furthermore, due to the modular nature of the OPA 100, the various systems and their subcomponents can be taken apart for transport and reassembled by a crew at a later time. Because the OPA 100 breaks down in this manner, the comparatively large system as a whole can be moved through small/tight spaces, for example, a hatch on the ISS or other spacecraft, or marine vessels. Similarly, the modular nature of the OPA 100 allows for individual components to be replaced or upgraded at a later time by a crew as new technologies develop or as part of maintenance of the OPA 100.

With additional reference to FIGS. 2 and 3, the flow and treatment of waste 104 through the OPA 100 may have a plurality of steps that will now be discussed in greater detail. To begin treating waste 104 at a first step 204, an initial flow of raw organic waste 104 may be received by the buffer tank 120. The flow of raw organic waste 104 may be provided by a first pump 208 of the pump system 112, which may be supported by the support rack 172. However, the first pump 208 may also be separate from the OPA 100. The purpose of the buffer tank 120 is to increase the capacity of the OPA 100 by managing solids and shielding the reactor 124 (i.e. the first reactor tank 128 and the second reactor tank 132) from shock loading events. In particular, the buffer tank 120, allows solids to increase residence time (which may be 1 to 10 days in some embodiments, depending on tank size and loading rate/throughput) in the buffer tank 120 to allow the buffer tank 120 to break those solids down and to better control introduction of waste 104 into the first reactor tank 128 and the second reactor tank 132. In this way, the buffer tank 120 acts as a means of pre-treating the waste to allow the OPA 100 to break down a greater variety of wastes, and to increase the efficiency of the OPA 100.

With regard to the buffer tank 120 providing pretreatment of the waste 104, the buffer tank 120 may be configured to provide at least one of chemical or enzymatic breakdown of the waste 104. To increase efficiency, the buffer tank 120 may be configured to operate under thermolytic conditions. However, the buffer tank 120 may also operate at ambient conditions, for example, 25 C. Under thermolytic conditions, the buffer tank 120 may operate at elevated temperatures (up to 200 C, but more preferably 60 C to 70 C) and/or at elevated pressures (up to 3 bar). Such increased temperatures and pressures provide increased energy for chemical reactions to occur and for enzymes to break the waste 104 down. Elevated temperatures may be achieved by the inclusion of a heater 212 (e.g., a resistive heating element) in the buffer tank 120, which may be controlled by the control system 116 in conjunction with a temperature sensor 216 (e.g., a thermocouple). These elevated temperatures and pressures can promote disintegration and hydrolysis of the waste 104 (i.e. hydrothermal liquefaction), which allows the buffer tank 120 to break the waste 104 down even faster, leading to increased system capacity and improved efficiency. Furthermore, by using such elevated temperatures, the waste 104 may also be disinfected, which can lead to overall increased safety of the OPA 100. Additionally, it should be appreciated that breakdown of the waste 104 in the buffer tank 120 may result in the production of some biogas, which may be collected by the gas collection system 144.

At a second step 220, waste 104 that has been broken down in the buffer tank 120 (i.e., liquids and solids that have been converted to liquids) can be transferred to the reactor 124. The reactor 124 may be configured as a two-stage anaerobic digester (i.e., bioreactor). While an aerobic digester may be used, an anaerobic digester has advantages that make it more adaptable to the environment of space. In particular, anaerobes have low energy requirement during treatment due to no aeration requirement and their slow metabolic activity, which consequently produces less biological sludge when compared to aerobic systems. Additionally, anaerobic digestion produces energy-rich biogas (containing methane and or hydrogen), which has excellent potential for recoverable energy and offsetting the energy demand required for treatment of the waste 104. Furthermore, during anaerobic digestion of the waste, plant essential nutrients (i.e., N, P, K) are released, making anaerobic treatment ideal for fertegation which introduces fertilizer into an irrigation system for plant delivery. Moreover, despite their aversion to oxygen, anaerobes are robust organisms and capable of immediate digestion, even after long-term starvation, making them most ideal for dormancy scenarios.

Figure 4:
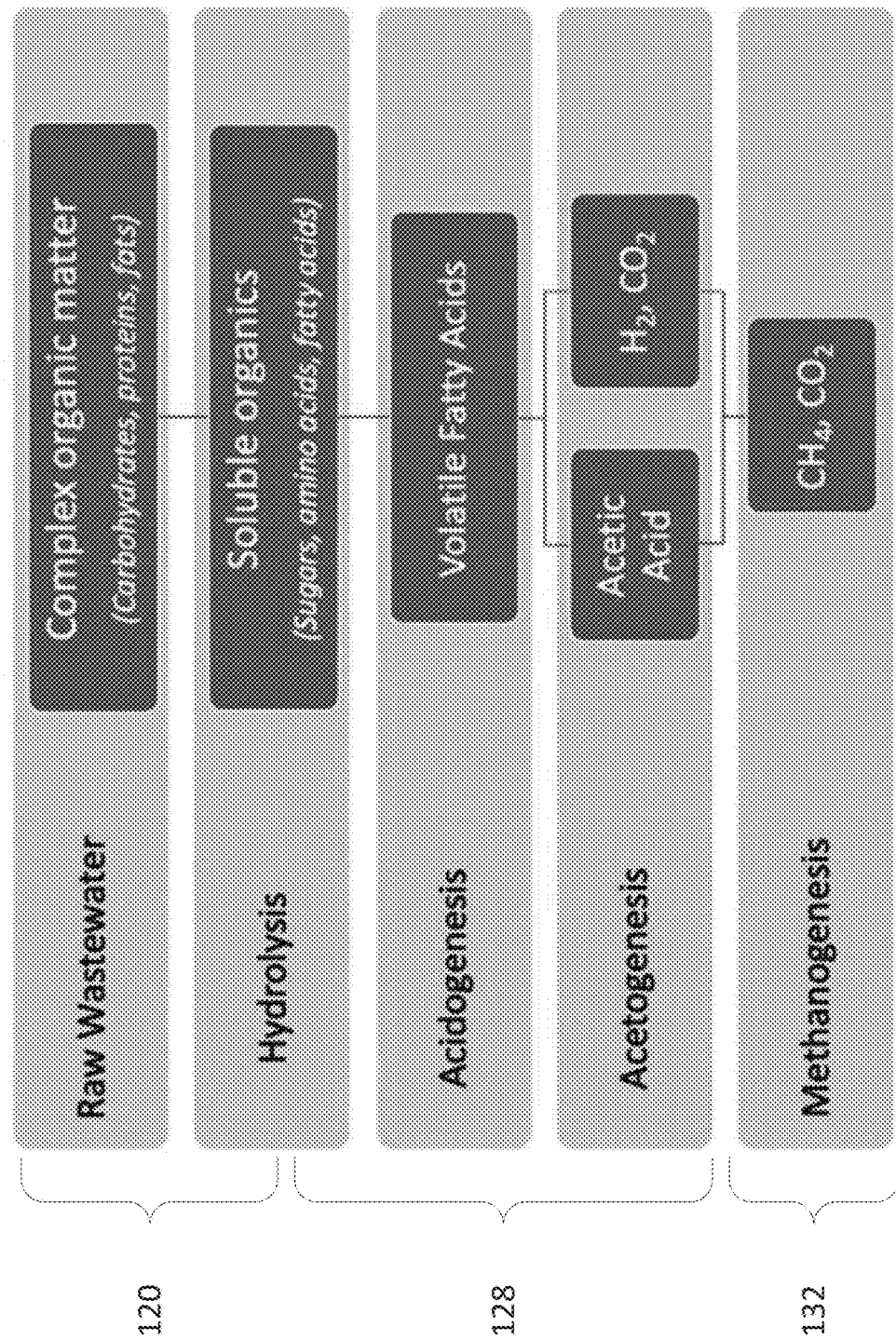
FIG. 4 is a diagram showing the anaerobic processes carried out by the modular system of FIG. 1.

With additional reference to FIG. 4, anaerobic digestion is a complex biologically mediated degradation process that is performed in the absence of oxygen. Anaerobic digestion has four key phases: hydrolysis, acidogenesis, acetogenesis, and methanogenesis. In the hydrolysis phase, anaerobes utilize extracellular enzymes to breaks down the large complex organics such as carbohydrates into simpler organic monomers. However, hydrolysis is difficult to carry out with solids, which can reduce the capacity of the OPA 100 due to increased residence time. This increased residence time is avoided by the pretreatment of the waste 104 in the buffer tank 120. Next, acidogenesis further breaks down these monomers to produce volatile fatty acids (VFAs), which have many commercial uses including biodiesel and bioplastics. Acetogens then uptake the VFAs to produce acetate, and a combination of hydrogen and carbon dioxide gas. Lastly methanogenesis utilizes the formed acetate to create a gaseous product primarily of methane, carbon dioxide, and trace amounts of including hydrogen sulfide, water vapor, and hydrogen. Due to the interconnection of microorganisms associated with anaerobic digestion the process is susceptible to various inhibitions. For example with the acids, hydrogen, and carbon dioxide produced during these last two stages, the pH of the reactor 124 can often be reduced and can potentially inhibit the methanogenesis.

To avoid some of these shortcomings and improve reactor 124 performance and efficiency, the reactor 124 may be split into a two-stage reactor (i.e., the first stage being in the first reactor tank 128 and the second stage being in the second reactor tank 132). In such a two-stage reactor, the second step 220 may be divided in to two sub-steps. In the first sub-step 224, a second pump 228 can pump at least a portion of the waste 104 from the buffer tank 120 and into the first reactor tank 128. It should be appreciated, that the waste 104 being pumped to the first reactor tank 128 may be primarily liquids since any solids (which would not break down as easily in the first reactor tank 128) tend to settle in the buffer tank 120. The first reactor tank 128 may be configured to primarily carry out the acidogenesis and acetogenesis phases of anaerobic digestion which creates an acidic environment and may be characterized by a lower pH (4-6). The acidic environment results from fermentative acid-producing bacteria (e.g., *Pelotomaculum* sp., *Syntrophobacter* sp., and *Syntrophomonas* sp.) continuing to breakdown particulates similarly to hydrolysis and producing organic acids. However, it should be appreciated that some methanogenesis may still occur in the first reactor tank 128 and the resultant biogas can be collected in the gas collection system 144.

By primarily carrying out the acidogenesis and acetogenesis phases in the first reactor tank 128, the organic acids can be better isolated so that they can be slowly and controllably introduced into the second reactor tank 132 and allow both the first reactor tank 128 and the second reactor tank 132 to operate more efficiently. In particular, the efficiency of the acidogenesis and acetogenesis phases can be improved by operating the first reactor tank under thermophilic conditions, at temperatures ranging from 50 C to 60 C, and more preferably 55 C, as these temperature are ideal for anaerobes that create organic acids and alcohols. To help maintain these temperatures, the first reactor tank 128 may be wrapped in an insulating material, for example, a mylar blanket and other plumbing can be wrapped with insulation to reduce heat loss between tanks. Alternatively, each modular unit in the system can have an insulated housing such that the entire unit is insulated rather than each component. In this way, individual components of a unit could be repurposed into other units without having to re-insulate on a component by component basis. Furthermore, the first reactor tank 128 may include a temperature sensor 216 to allow the control system 116 to monitor the temperature of the first reactor tank 128. In addition to thermal cascade from the buffer tank 120, first reactor tank 128 and second reactor tank 132 can also optionally each be heated directly with a heating element 212.

In a second sub-step 232, at least a portion of the waste 104 that has underwent acidogenesis in the first reactor tank 128 can then be pumped by a third pump 236 to the second reactor tank 132. The second reactor tank 132 may be configured to primarily carry out the methanogenesis phase of anaerobic digestion, which comparatively produces the most biogas of any of the other stages. By the time the waste 104 enters the second reactor tank 132, after having passed through both the buffer tank 120 and the first reactor tank 128, a majority of the digested particulates in the waste 104 have been fragmented down from complex polymers and carbohydrates into simple organic compounds (i.e., volatile fatty acids, in particular, acetic acid). In this final stage of anaerobic digestion, these digested constituents are converted by methanogenic anaerobes (e.g. archea, including *Methanothrix* sp. *Methanosaeta* sp., and *Methanosarcina* sp.) into a biogas, primarily comprised of methane, carbon dioxide and hydrogen, and a fraction of some of the constituents utilized for biomass generation. This produces a highly digested waste 104 (e.g., effluent) containing minimal solid particulates, liberated and soluble constituents, and a biogas that possesses a strong energy potential.

Furthermore, because the more acidic acidogenesis and acetogenesis phases are carried out primarily in the first reactor tank 128, there may be minimal inhibition from the acids produced in the first reactor tank 128, which can allow for the methanogenic anaerobes to operate more efficiently, as they tend to prefer a more neutral pH (6.5-7.5). Additionally, the methanogenic anaerobes tend to prefer lower temperature, so the second reactor tank 132 may be kept at ambient (15 C-25 C) or mesophillic temperatures of 30 C to 35 C. To help maintain these temperatures, the second reactor tank 132 may be wrapped in an insulating material, for example, a mylar blanket. Furthermore, the second reactor tank 132 may include a temperature sensor 216 to allow the control system 116 to monitor the temperature of the second reactor tank 132.

It is to be appreciated that, upon initial setup and periodically throughout operation, in maybe necessary to inoculate the first reactor tank 128 and/or the second reactor tank 132 with anaerobes to allow the first reactor tank 128 and/or the second reactor tank 132 to digest the waste 104. It is contemplated that such anaerobes may be specifically selected for each of the first reactor tank 128 and/or the second reactor tank 132, so that each respective tank may be inoculated with anaerobes that are particularly adapted to each specific environment. However, it is also contemplated that a mixed batch of anaerobes could be introduced into either tank, as those anaerobes that are capable of surviving their respective environments would thrive and reproduce, while the others would die off, thereby naturally selecting for the most efficient anaerobes for each respective tank and stage of digestion.

It should be appreciated that while each of the buffer tank 120, first reactor tank 128, and second reactor tank 132 are configured to primarily carry out one or more step of anaerobic digestion, in practice the respective tanks may carry out any of the other steps to a lesser extent. Further, while each of the tanks may operate most efficiently at the above-described temperatures, the OPA 100 is still able to operate even when the tanks are not at these temperatures, (e.g. wherein all tanks are kept at ambient temperature).

Having undergone methanogenesis in the second sub-step 232, the digested waste 104 can then be pumped into the membrane module 136 by a fourth pump 240 at a third step 244. With additional reference to FIGS. 5 and 6, the membrane module 136 may include a one or more membranes 248 that may be configured to filter a permeate 252 (e.g. water) from the waste 104. The membranes 248 may be contained in a cylindrical body 256 configured to retain a plurality of tubular ultrafiltration, polyvinylidene fluoride (PVDF) membranes 248. The membranes 248 may have a diameter of 5.2 mm and an average pore size of 0.03 μm. Additionally, the membrane module 136 may include one or more spacers 256 to space the membranes 248. It should be appreciated that the membrane module 136 as shown and described is merely an example and that other sizes and shapes of membrane modules 136 may also be used.

It should be appreciated that the body 256 of the membrane module 136 may be made, at least partially, from a clear material to allow a user to inspect the condition of the membranes 248 for fouling (e.g., a cake layer of particulates and biomass that decrease active membrane surface area by clogging pores, and in severe cases clogging entire membranes, all of which result in decreased membrane permeability and reduce system efficiency).

To filter the permeate 252 from the waste 104 the membrane module 136 relies on a pressure gradient formed between the two sides of the membrane 248, known as Transmembrane Pressure (TMP). To create the requisite TMP, a fifth pump 264 may be configured to pump the permeate 252 from the membrane module 136 and into the permeate tank 140. Together the fourth pump 240, which provides positive pressure, and the fifth pump 264, which provides negative pressure, establish the requisite pressure gradient across the membranes 248 to create the TMP.

During filtration of the permeate 252 from the waste 104, it may not be possible and/or advantageous to remove all of the available permeate 252 from the waste 104. For example, it may be desirable to only remove 90% of the available permeate 252 due to the increased energy required to filter any additional permeate 252. Having had at least a portion of the permeate 252 removed, the remaining waste 104 may now be more concentrated. This concentrated waste 104 may then be returned to the second reactor tank 132 for further digestion. Because, the now concentrated waste 104 may be returned back to the second reactor tank 132, the concentration of the waste 104 in the second reactor tank 132 may continue to build over time, leading to lower system efficiency. To address this problem, it is contemplated that the concentrated waste 104 from the membrane module 136 may alternatively be discarded. Alternatively, the waste 104 can be continually fed through the membrane module 136 rather than in batches. Moreover, as will be discuss below, the OPA can be run in reverse to remove concentrated waste 104, which may increase the amount of solids in the reactor 124, thereby flushing the concentrated waste 104 from the reactor 124 and back to the buffer tank 120, where it may be removed or further processed in the buffer tank 120.

Turning back to FIGS. 1-3, in a fourth step 268, having been separated from the waste 104 by the membrane module 136, the permeate 252 may be pumped from the membrane module 136 to the permeate tank 140, which may be configured to collect and store the permeate 252 for later use by additional systems. Furthermore, the permeate tank 140 may include a temperature sensor 216 to allow the control system 116 to monitor the temperature of the permeate tank 140. Then, in a fifth step 272, the permeate 252 can be pumped to these additional systems by a sixth pump 276. It should be appreciated that the sixth pump 276 may be part of the pump system 112 of the OPA 100, or it may be separate.

With regard to the gas collection system 144, in a sixth step 280, the gas collection system 144 may be configured to collect biogas (e.g. methane) from any of the buffer tank 120, first reactor tank 128, and the second reactor tank 132. To enable the collection of biogas from the buffer tank 120, the first reactor tank 128, and the second reactor tank 132, each of the respective tanks must only be partially filled to allow for an open and unused volume for biogas to collect in. In particular, the biogas will rise to the top of each of the buffer tank 120, first reactor tank 128, and the second reactor tank 132, and having unfilled space at the top of the respective tanks allows the biogas to be easily collected. It should be appreciated that the biogas creates a positive pressure in the tanks (i.e., greater than atmospheric pressure) that can allow the biogas to be collected from the respective tanks without the need for pumps. Furthermore, to help promote an anaerobic environment, the upper, unfilled portions of each of the buffer tank 120, first reactor tank 128, and the second reactor tank 132 may be connected.

Turning briefly to FIGS. 7 and 8, it is contemplated that it may be desirable to perform additional, optional processes on the permeate 252. For example, even after following separation via the membrane module 136, the permeate 252 may still contain dissolved gases. To recover these dissolved gases, in a seventh step 284, a degassing membrane 288 may be disposed between the membrane module 136 and the permeate tank 140. The recovered gases may be pumped by a gas pump 292 to be collected by the gas collection system 144.

Furthermore, in an eighth step 294, the permeate 252 that has been stored for long period of time may be susceptible to spoilage or other contamination. To reduce the possibility of contamination and allow for longer storage durations, an optional microstatic disinfection loop 296 may be included. The microstatic disinfection loop 296 may be configured to recirculate permeate 252 from the permeate tank 140 (i.e., drawn from the permeate tank 140, disinfected and/or treated and then returned). The microstatic disinfection loop 296 may include a recirculation pump 300, a carbon scrubber 304 (e.g., a granular activated carbon (GAC) column), and a UV module 308 (e.g. a UV-LED that produces UV-C light). The purpose of the carbon scrubber 304 is to remove organic carbon (e.g., aromatic carbon) which may absorb UV light and interfere with the ability of UV-C generated by the UV module 308 to penetrate and disinfect the permeate 252. The microstatic disinfection loop 296 may operate continuously or intermittently.

Turning now to FIG. 9, an example control system 116 is shown. As mentioned, the control system 116 may be configured to monitor and control the flow of waste 104 through the OPA 100. To do so, the PLC 160 may run a program that may be stored in the onboard memory 164. It should be appreciated that the control system 116 may include other components and features as known in the art, for example, additional processors or sensors to allow the control system 116 to carry out additional functions as may be necessary for a specific application. The control system 116 may be designed to be fully automated and may incorporate many safety features and/or fail safes (electrical or mechanical) to prevent system malfunction, and may be configured to provide various warning signal (audible and/or visual) to notify a user of a malfunction should one occur. The control system 116 may be operatively connected to each of the pumps 156 of the pump system 112, such that the control system 116 can individually power the pumps 156. The control system 116 may be configured to operate the pump system 112 in accordance with input signals received from the plurality of sensors 168. The plurality of sensors 168 may include a high-level sensor 312 and a low-level sensor 316 in each of the buffer tank 120, first reactor tank 128, and the second reactor tank 132, and the permeate tank 140. In addition, the plurality of sensors 168 may include one or more liquid sensors 320 to detect leaks in the OPA 100. The liquid sensors 320 may be installed on each of the first shelf 176, the second shelf 180, and the third shelf 184 of the support structure 172. Furthermore, the plurality of sensors 168 may include a gas bag sensor 324 to monitor gas levels in the gas collection system 144, and may also include various pressure sensors within the tanks and hoses, flow sensors disposed with respect to the various hoses of the system, and other sensors. Each sensor may be in communication with an indicator—the indicators may be associated with a user interface for the system and/or indicators disposed on the outside of each modular unit (e.g., LEDs on the outside of the tank subsystem modular unit, to indicate liquid leak; or a fault sensor located on the outside of the pump subsystem to indicate a fault in pumping control).

With regard to the high-level sensors 312 and the low-level sensors 316, these sensors can output a signal to the control system 116, which can signal the control system 116 to stop and/or start operating the pump system 112. The high-level sensor 312 may be activated to output a signal when waste 104 or permeate 252 reaches or rises above the high-level sensor 312 and the low-level sensor 316 may be activated to output a signal when waste 104 or permeate 252 drops below the low-level sensor 316.

For example, each of the buffer tank 120, first reactor tank 128, and the second reactor tank 132, and the permeate tank 140 may have a capacity of 20 L and the high-level sensor 312 may be positioned at a fluid level corresponding to 19 L of waste 104 or permeate 252 and the low-level sensor 316 may be positioned at a fluid level corresponding to 18 L of waste 104 or permeate 252. When waste 104 and/or permeate 252 is drawn from one of the respective tanks such that the fluid level drops below 18 L, the control system 116 may be configured to operate the respective pump (e.g. operating the first pump 208 to fill the buffer tank 120, the second pump 228 to fill the first reactor tank 128, etc.) of the pump system 112 to begin filling the tank. Conversely, when the waste 104 level reaches 19 L, the control system 116 may be configured to stop operating the respective pumps of the pump system 112 to prevent overfilling of the tank. Alternatively, if a tank becomes overfilled, the control system 116 may be configured to activate the pump system 112 to empty the tank to permissible level, which may require lowering the fluid level in one or more other tanks. For example, if the buffer tank 120 were overfilled (i.e. greater than 19 L), the control system 116 could operate the second pump 228 to move waste 104 from the buffer tank 120 to the first reactor tank 128. Additionally, if this causes the first reactor tank 128 to also become overfilled, the control system 116 could also operate the third pump 236 to move waste 104 from the first reactor tank 128 to the second reactor tank 132, etc.

Under standard operating conditions, it is contemplated that the control system 116 operates the pump system 112 as the waste 104 is treated and removed from the OPA 100. That is, when the permeate 252 is required by another system, the control system 116 can power the sixth pump 276 to provide the permeate 252 to the other system. If the permeate 252 drops below the low-level sensor 316, the control system 116 can be signaled to operate both the fourth pump 240 and the fifth pump 264 to transfer waste 104 from the second reactor tank 132 to the membrane module 136, thereby creating more permeate 252 to refill the permeate tank 140. Once the high-level sensor 312 of the permeate tank 140 or the low-level sensor 316 of the second reactor tank 132 are activated, the control system 116 can be signaled to stop operating the fourth pump 240 and/or the fifth pump 264 to prevent over filling and/or over depletion of the respective tanks.

Similarly, when the low-level sensor 316 of the second reactor tank 132 is activated, the control system 116 can be signaled to operate the third pump 236. By activating the third pump 236, waste 104 may be moved from the first reactor tank 128 to the second reactor tank 132. Once the high-level sensor 312 of the second reactor tank 132 or the low-level sensor 316 of the first reactor tank 128 are activated, the control system 116 can be signaled to stop operating the third pump 236 to prevent over filling and/or over depletion of the respective tanks.

Likewise, when the low-level sensor 316 of the first reactor tank 128 is activated, the control system 116 can be signaled to operate the second pump 228. By activating the second pump 228, waste 104 may be moved from the buffer tank 120 to the first reactor tank 128. Once the high-level sensor 312 of the first reactor tank 128 or the low-level sensor 316 of the buffer tank 120 are activated, the control system 116 can be signaled to stop operating the second pump 228 to prevent over filling and/or over depletion of the respective tanks.

However, in some cases, it may be advantageous to operate the OPA 100 in reverse (i.e. cause the permeate 252 and or waste 104 to flow through the OPA 100 from the permeate tank 140 and back to the buffer tank 120). In particular, such reverse operation may be useful for intermittently cleaning the membranes 248 to reduce fouling and improve overall system performance and efficiency. More specifically, the control system 116 may power both the fourth pump 240 and the fifth pump 264 in reverse to transfer permeate 252, at a high flow rate, from the permeate tank 140, through the membranes 248 and into the second reactor tank 132. In doing so, the high speed flow of permeate 252 generated by the fourth pump 240 and the fifth pump 264 can create a strong cross flow velocity that extricates foulants that are caked onto the membranes 248. The control system 116 may reverse the flow in this manner for a predetermined period of time and/or until the low-level sensor 316 of the permeate tank 140 is activated. For example, the control system 116 may be configured to reverse flow for 15 seconds for every 15 minutes forward flow, and may also include a period of no flow between forward and reverse flow cycles. In this way, the control system 116 can ensure continued efficient operation of the OPA 100.

In addition, turning briefly to FIG. 7 it is contemplated that the OPA 100 may optionally include a cleaning loop 328 that may allow chemical agents (e.g. A 0.01% (500 ppm) solution of sodium hypochlorite) to be added to further clean the membrane 248 and remove foulants. The cleaning loop 328 may include a cleaning pump 332 may be configured to recirculate the chemical agents through the membrane module 136. To do so, the control system 116 may be configured to have a chemical cleaning mode, which can pause normal operation of the OPA 100, and which may be manually enter by a user, or automatically by the control system 116 after a predetermined period of time. In the chemical cleaning mode, the chemical agents can be added, after which the control system 116 may operate the cleaning pump 332 to cause forward flow through the membranes 248 for 30 minutes, followed by 30 minutes of reverse flow. It should be appreciated that these times may be varied or modified to have a different flow cycle. Once the chemical agents have cleaned the membranes 248, clean water or another fluid may be run through the cleaning loop 328 to remove and/or neutralize any remaining chemical agents. After the cleaning mode has been completed, the control system 116 may be configured to resume normal operation of the OPA 100.

Figure 2:
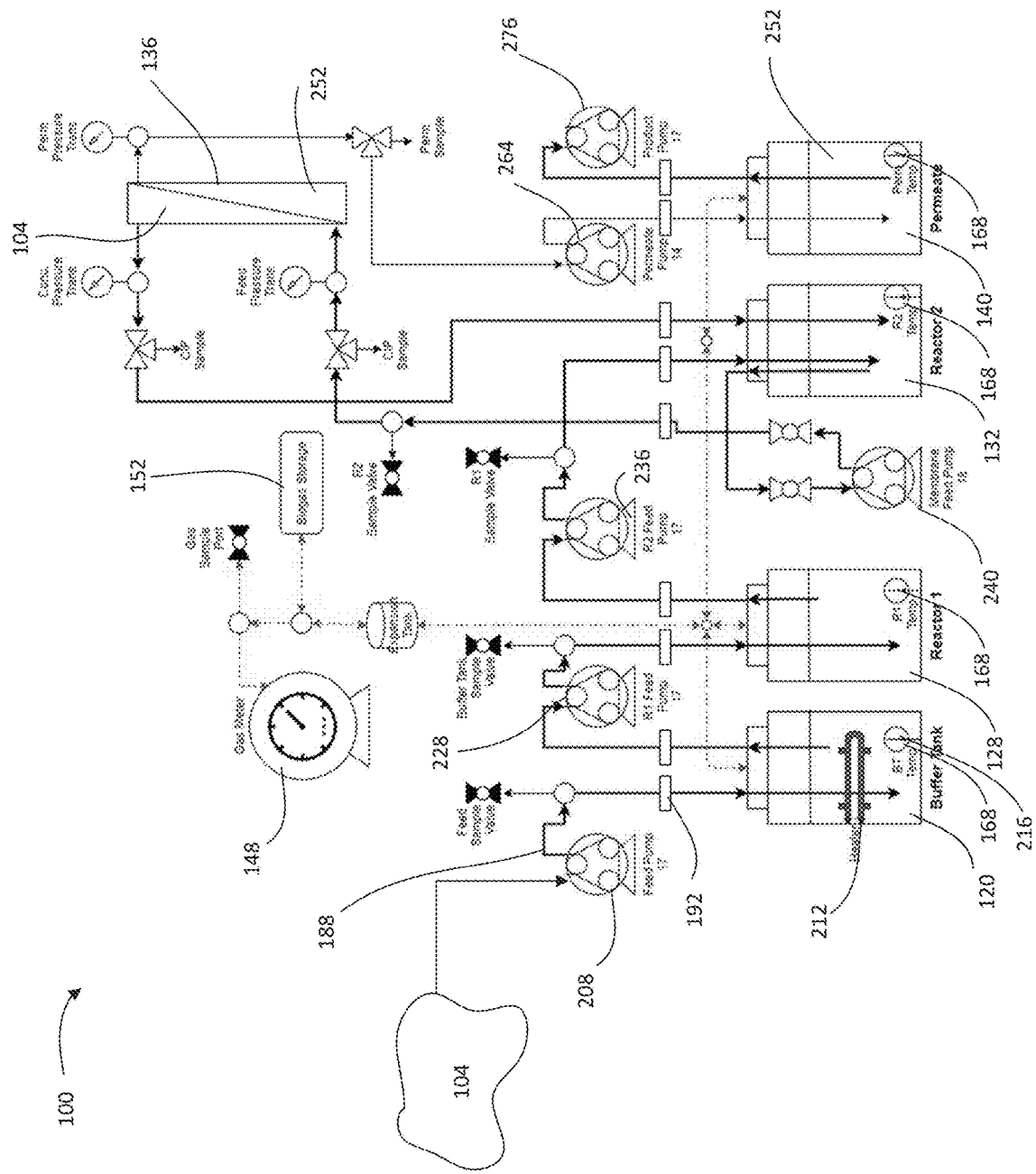
FIG. 2 is a schematic view of a flow diagram of the modular system of FIG. 1.
Figure 3:
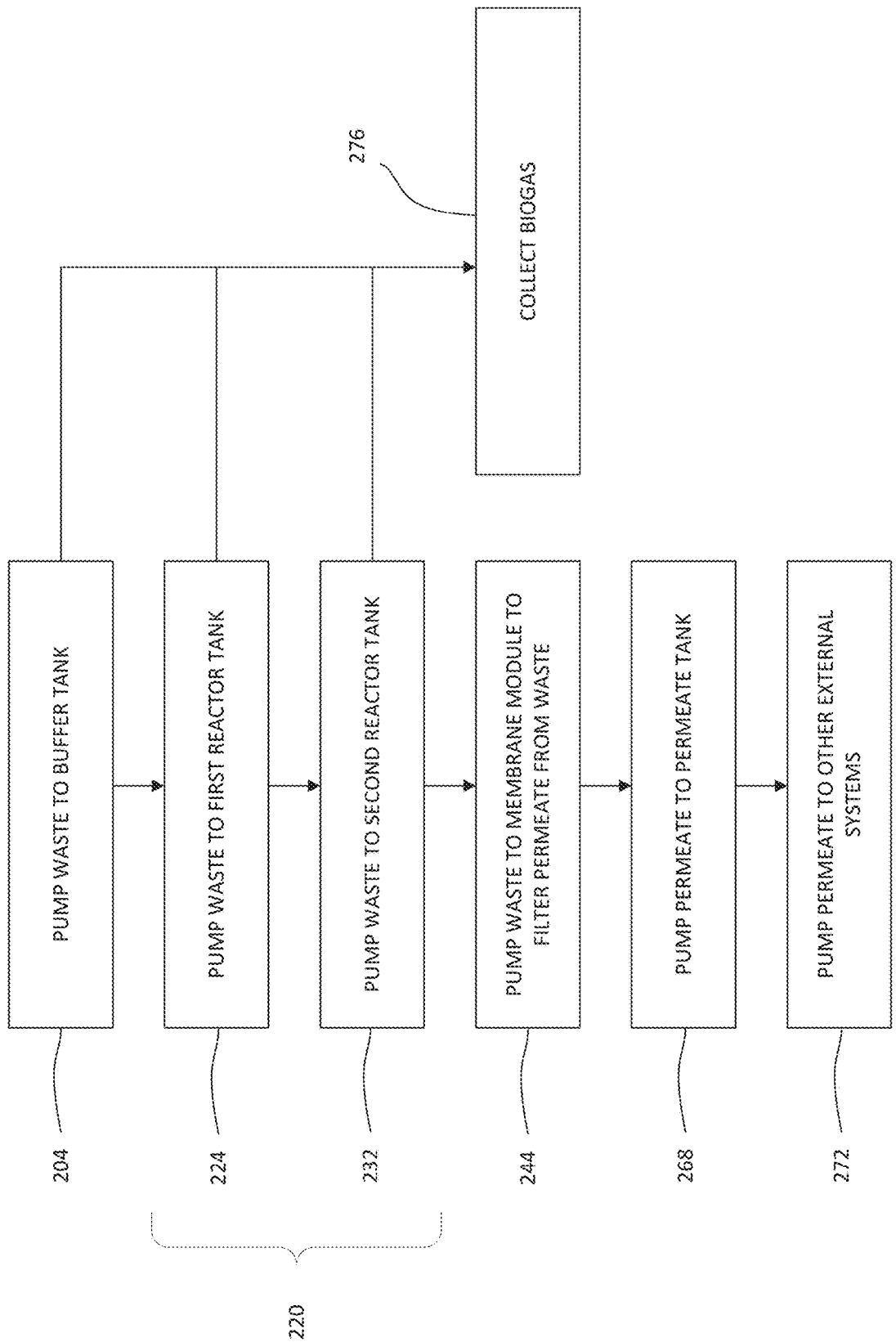
FIG. 3 is a method of anaerobic digestion of waste than can be performed by the modular system of FIG. 1

Turning now to FIGS. 2 and 9, the control system 116 may also be configured to monitor and maintain the temperature of any of the buffer tank 120, first reactor tank 128, and the second reactor tank 132, and the permeate tank 140. For example, as shown in FIG. 2, the buffer tank 120 can include the heater 212 to create and maintain a thermolytic environment and the temperature sensor 216 (e.g., a thermocouple). The control system 116 may be connected with the heater 212 and the temperature sensor 216, and may power the heater 212 in accordance with a signal from a temperature sensor 216 to maintain the temperature of the buffer tank 120 at a desired temperature (e.g. 70 C). Alternatively, the two reaction tanks may also be heated directly, and/or each modular unit may be heated. In some embodiments, the heaters may themselves be separate modules so that, in the event of a heater failure, the heater module can be replaced without having to replace an entire tank unit. In some cases, a temperature sensor controller 336 (e.g. a PID controller) may act to translate the signal from the temperature sensor 216 into a signal that can be understood by the control system 116.

Furthermore, the control system 116 may be configured with one or more failsafe modes to prevent system failures of the OPA 100, which could otherwise cause the OPA 100 to become damaged or inoperative. For example, if the control system 116 determines that one or more of the of the buffer tank 120, first reactor tank 128, and the second reactor tank 132, and the permeate tank 140 become over or underfilled, the control system 116 may drive any combination of the pumps 156 of the pump system 112 to bring the tanks back to a desirable fill level. Additionally, if the control system 116 determines that one or more of the pumps of the pump system 112 have failed, the control system 116 may place the OPA 100 in a stasis or standby mode to preserve the condition and future operability of the OPA 100. Furthermore, if the control system 116 determines that one or more of the plurality of sensors 168 has experienced a failure, the control system 116 may also place the OPA 100 in a stasis or standby mode to preserve the condition and future operability of the OPA 100. Where a failure is detected, the control system 116 may also be configured to trigger an audible and/or visual warning signal, along with remote notification messages, to notify a user, crew, or remote supervisor that there is a problem with the OPA 100.

Referring now to FIG. 10, a graph 1000 is depicted. A demonstration trial of one embodiment of an OPA for treating simulated fecal organic matter was conducted over 201 days. During Stage A (days 0-89), approx. 10 g/L of the simulant was added, and during Stage B (days 90-201), approx. 30 g/L of the simulant was added. FIG. 10 depicts the concentration of total organic carbon (TOC) in the influent and effluent of the OPA. The OPA was able to efficiently remove TOC from approx. 7000 mg/L to approx. 700 mg/L, with a removal efficiency of approx. 90%.

We claim:

1. A modular system for waste treatment, water recycling, and resource recovery, the modular system comprising:
   a buffer tank configured to receive and pre-treat raw organic waste, the raw organic waste comprising at least one of solid fecal waste, complex polymers, carbohydrates, proteins, and fats;
   a first reactor tank configured to facilitate at least one of hydrolysis, acidogenesis, and acetogenesis to form organic acids and alcohols;
   a second reactor tank configured as an anaerobic digester that receives digested waste from the first reactor tank, wherein the second reactor tank is configured to facilitate methanogenesis;
   a membrane module having a membrane configured to filter waste from the digested waste from the second reactor tank to produce a permeate;
   a permeate collection tank is configured to collect and store the permeate generated by the membrane module;
   a pump system having a plurality of pumps to pump waste between the buffer tank, at least one of the first and second reactor tanks, the membrane module, and the permeate collection tank; and
   a control system configured to monitor a flow of waste and to control the pump system to control the flow of waste between the buffer tank, at least one of the first and second reactor tanks, the membrane module, and the permeate collection tank.

2. The modular system of claim 1, further comprising a support structure configured to support any of the buffer tank, at least one of the first and second reactor tanks, the membrane module, the pump system, and the control system.

3. The modular system of claim 2, wherein the buffer tank, at least one of the first and second reactor tanks, and the permeate collection tank are positioned below the pump system, the control system, and the membrane module.

4. The modular system of claim 3, wherein the pump system is positioned below the control system, and the membrane module.

5. The modular system of claim 2, wherein the support structure is configured as an Expedite the Processing of Experiments to Space Station (EXPRESS) rack.

6. The modular system of claim 1 further comprising a gas meter and a gas bag to variably store biogas from at least one of the first and second reactor tanks.

7. The modular system of claim 1, wherein at least one of the first and second reactor tanks include anaerobes to facilitate anaerobic breakdown of the digested waste.

8. The modular system of claim 1, wherein each of the buffer tank, at least one of the first and second reactor tanks, and the permeate collection tank include a respective sensor configured to measure an amount of the waste or the permeate in each respective tank, and wherein the control system is configured to move fluid between the buffer tank, at least one of the first and second reactor tanks, the membrane module, and the permeate collection tank based on a signal from the respective sensors.

9. The modular system of claim 8, wherein the control system is configured to maintain a volume of contents in each of the buffer tank, at least one of the first and second reactor tanks, and the permeate collection tank.

10. The modular system of claim 1, wherein the membrane module is configured to return a waste concentrate from the membrane module to at least one of the first and second reactor tanks.

11. The modular system of claim 1 further comprising a disinfection loop that recirculates the permeate in the permeate collection tank, the disinfection loop including an ultraviolet (UV) module to disinfect the permeate.

12. The modular system of claim 1 further comprising a degassing membrane positioned between the membrane module and the permeate collection tank, the degassing membrane configured to remove dissolved gasses from the permeate.

13. The modular system of claim 1, wherein each of the buffer tank, at least one of the first and second reactor tanks, the membrane module, the permeate collection tank, the pump system, and the control system, are configured as individual modules that can be customizably assembled by a user.

14. A modular system comprising: a support structure; a waste treatment modular unit including: a buffer tank configured to receive and pre-treat raw organic waste; a first reactor tank configured as an anaerobic digester that receives and digests pre-treated waste from the buffer tank, wherein the first reactor tank is configured to facilitate at least one of hydrolysis, acidogenesis, and acetogenesis to form organic acids and alcohols; a second reactor tank configured as an anaerobic digester that receives digested waste from the first reactor tank, wherein the second reactor tank is configured to facilitate methanogenesis; a membrane module having a membrane configured to filter waste from the digested waste from the second reactor tank to produce a permeate; and a permeate collection tank configured to collect and store the permeate generated by the membrane module; a pump modular unit having a plurality of pumps configured to pump waste through the waste treatment modular unit; and a control modular unit configured to monitor a flow of waste and to control the pump modular unit to control the flow of waste through the waste treatment modular unit.

15. The modular system of claim 14, wherein each of the waste treatment modular unit, the pump modular unit, and the control modular unit contain quick connect adaptors, and wherein the units are configured to be removed and installed as entire units of the modular system and to be customizably assembled by a user.

16. The modular system of claim 14, wherein the support structure is configured as an Expedite the Processing of Experiments to Space Station (EXPRESS) rack.

17. The modular system of claim 14, wherein the permeate collection tank is configured to transfer permeate to another system for additional treatment.

18. The modular system of claim 14, wherein the buffer tank is configured to facilitate at least one of chemical or enzymatic breakdown of the raw organic waste.

19. The modular system of claim 18, wherein the buffer tank is configured to operate under a temperature of 60 C to 70 C, the first reactor tank is configured to operate under a temperature of 50 C to 55 C, and the second reactor tank is configured to operate under a temperature of 20 C to 35 C.

\* \* \* \* \*